United States Patent

[11] 3,602,385

[72] Inventor Frederick George Wilson
   49 Hillsborough Old Road Antrim,
   Lisburn, Northern Ireland
[21] Appl. No. 803,695
[22] Filed Mar. 3, 1969
[45] Patented Aug. 31, 1971
[32] Priority Mar. 1, 1968
[33]   Great Britain
[31]   9994/68

[54] FORK LIFTING APPARATUS
   6 Claims, 6 Drawing Figs.
[52] U.S. Cl. .................................................. 214/671,
                                                        214/730, 214/674
[51] Int. Cl. .................................................... B66f 9/20
[50] Field of Search............................................ 214/660,
                                                        670-674, 730, 75

[56]            References Cited
        UNITED STATES PATENTS
3,011,652  12/1961  Falk et al. ...................... 214/75 X
3,175,722  3/1965   Paulssen........................ 214/731
3,182,826  5/1965   Mutto............................ 214/671 X
3,239,088  3/1966   Sano............................. 214/730
3,335,879  8/1967   Shaffer.......................... 214/671 X
3,395,820  8/1968   Mathew et al. ................ 214/671

Primary Examiner—Gerald M. Forlenza
Assistant Examiner—Raymond B. Johnson
Attorney—Young & Thompson ABSTRACT: A road vehicle is provided with a forklift assembly located behind the driver's cabin and on the driver's side of the vehicle. The assembly is pivotal about a vehicle pillar between an inboard position and an outboard position. In the outboard position the mast assembly can be extended to raise the forks or fully retracted to lower the forks to ground level. In the inboard position the mast assembly is partially extended so that the forks overlie the chassis of the vehicle.

The forks are retractable so that the vehicle, with the mast assembly in the outboard position and the forks retracted can be driven alongside a pallet. The forks are extended under the pallet and the assembly extended to raise the pallet and swing it inboard.

The vehicle is preferably articulated with the forklift assembly mounted in the traction unit, thus allowing the traction unit to more easily load and unload the trailer.

Inventor
FREDERICK GEORGE WILSON
By Young & Thompson
Attorneys

Inventor
FREDERICK GEORGE WILSON
By Young & Thompson
Attorneys

FORK LIFTING APPARATUS

This invention relates to lifting apparatus for location on the chassis of a vehicle.

The present invention is a lifting apparatus comprising a base plate for location on a vehicle chassis, an upright pillar journaled in the base plate, a fork lift mast assembly mounted on the pillar for pivotal movement about the axis of the pillar between two extreme positions, means to pivotally move the assembly about the pillar, the mast assembly having stationary and movable members, at least one track carried by the base plate and at least one roller mounted on the mast assembly, each roller to engage a track to support and give added stability to the mast assembly during use, a fork carrier mounted on the lower end of the movable members of the mast assembly and having at least two rigid forks which are retractably mounted on the carrier, means being provided to adjust the angular disposition of the mast assembly relative to the chassis and including anchor members to secure the base plate to the chassis at three angular positions at least two of said members being height adjustable and each constituted by a hydraulic ram, the third member being constituted by a ball and socket joint.

Preferably, a rack is provided on the upper face of each of the forks, a toothed wheel being mounted on the carrier one for each rack, the teeth of each wheel meshing with the teeth of the corresponding rack, and power operated means for rotation of the toothed wheels to extend or retract the forks relative to the carrier.

The present invention includes a power driven wheeled vehicle having a driver's cabin mounted on the chassis, a base plate mounted on the chassis at the rear of the driver's cabin, an upright pillar journaled in the base plate adjacent to the cabin at the driver's side thereof, a fork lift mast assembly mounted on the pillar, the mast assembly being pivotally movable between an inboard position in which the mast assembly is adjacent to the rear of the cabin, and an outboard position in which the mast assembly extends beyond the side of the chassis, means to pivotally move the assembly about the pillar, the mast assembly having stationary and movable members, at least one track carried by the base plate and at least one roller mounted on the mast assembly, each roller to engage a track to support and give added stability to the mast assembly during use, a fork carrier mounted on the mast assembly and having at least two rigid forks which are retractably mounted on the carrier, means being provided to adjust the angular disposition of the mast assembly relative to the chassis and including anchor members to secure the base plate to the chassis at three angular positions at least two of said members being height adjustable and each constituted by a hydraulic ram, the third member being constituted by a ball and socket joint, the rams being adjustable to alter the angular disposition of the mast assembly to tilt the forks upwardly or downwardly and to plumb the mast assembly to enable the forks to be planar with an undersurface of a load to be lifted and to enable the mast assembly and forks, when loaded, to be then plumbed to enable the forks to be planar with the surface on which the load is to be deposited.

An embodiment of the present invention will now be described, by way of example, with reference to the accompanying drawings, in which.

Figure 1:
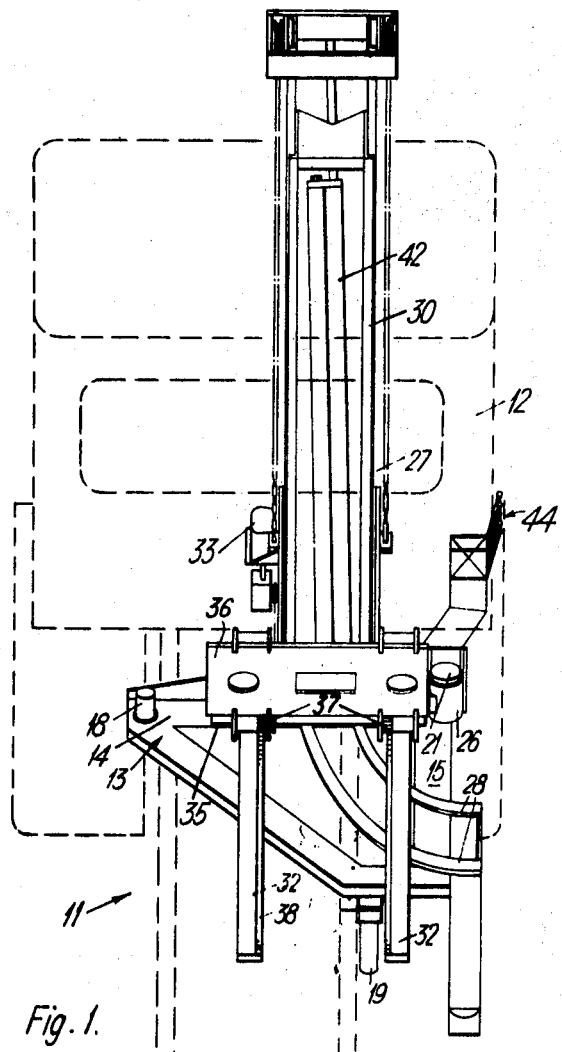
FIG. 1 is a perspective view of a lifting apparatus according to the invention mounted on a vehicle.
Figure 2:
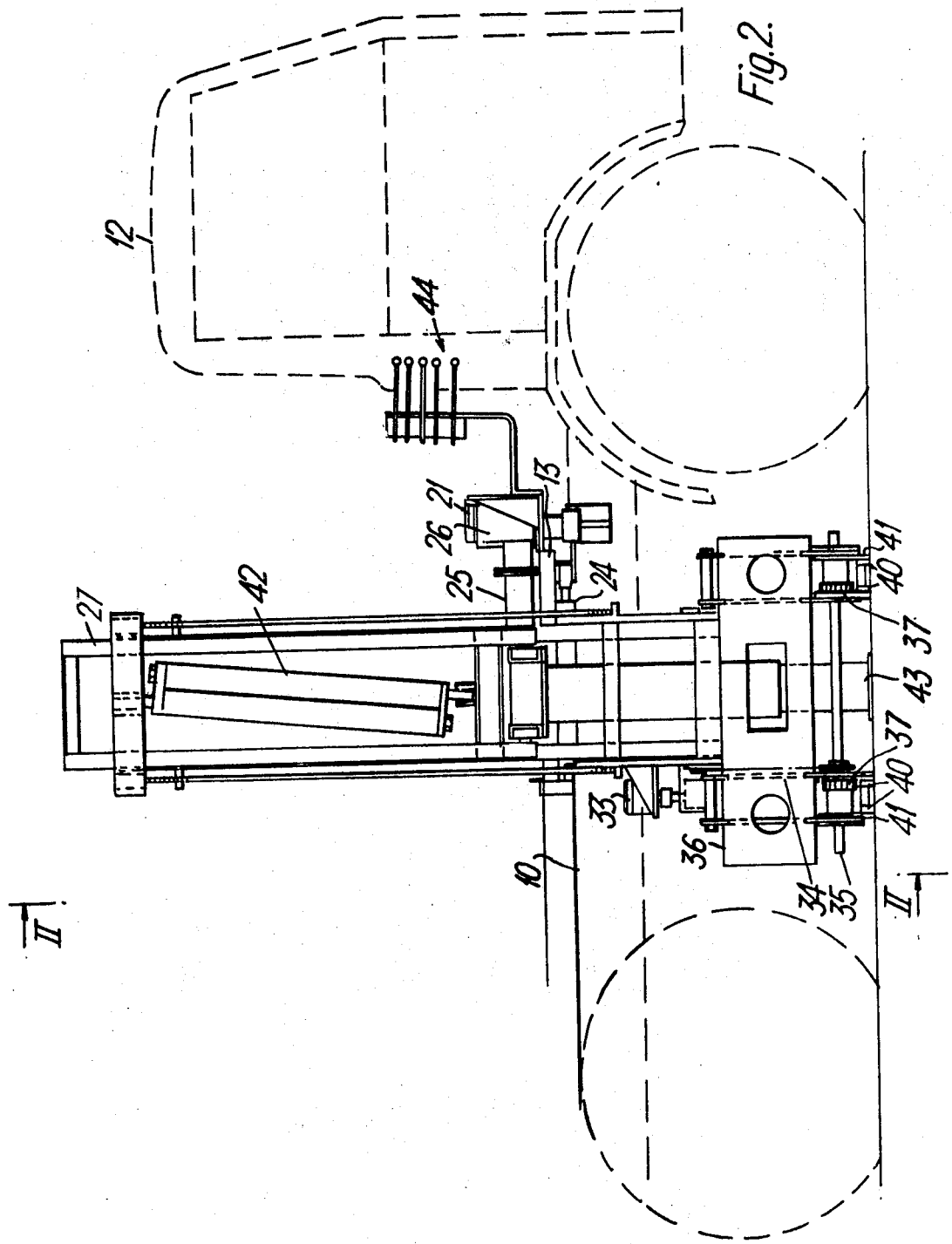
FIG. 2 is a side elevation of the apparatus mounted on the vehicle with the fork carrier of the apparatus located at ground level.
Figure 3:
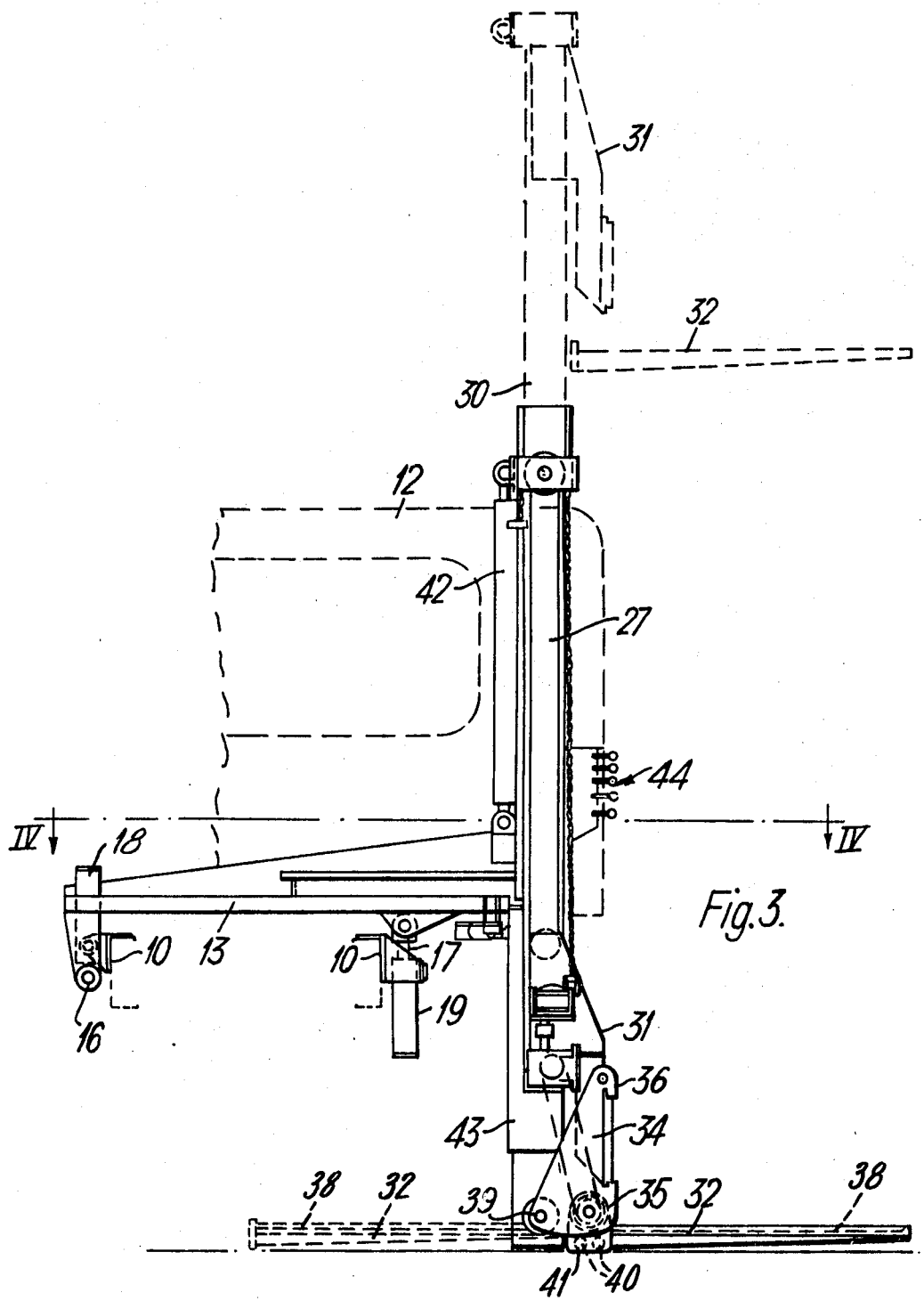
FIG. 3 is an end elevation on the line II—II of FIG. 2 showing also in dotted line the upper extent of the carrier, and the retractable position of the forks.
Figure 4:
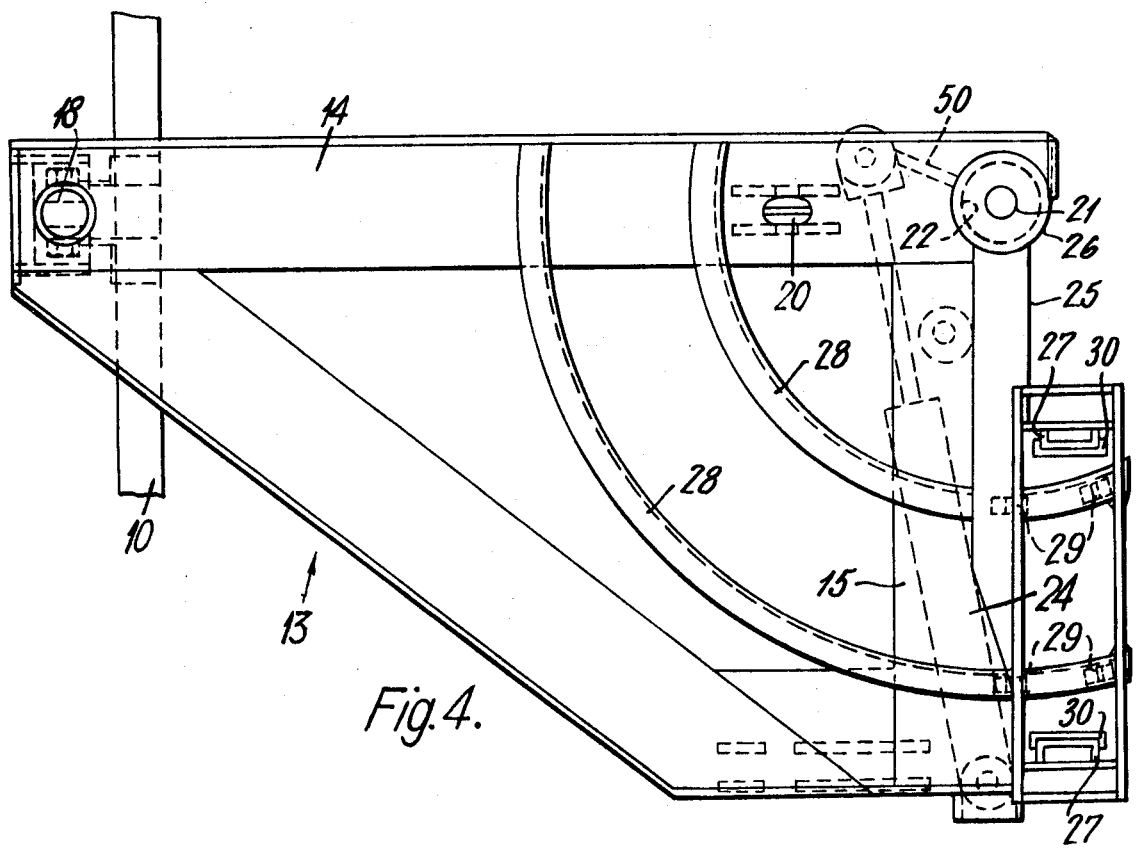
FIG. 4 is a section on the line IV—IV of FIG. 3 with parts omitted for the sake of clarity.
Figure 5:
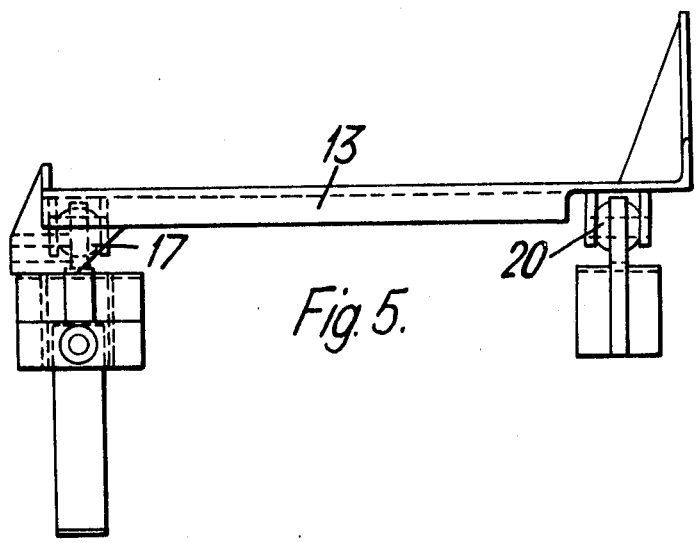
FIG. 5 is a side elevation of a base plate.

Referring firstly to FIGS. 1, 2 and 3, a lifting apparatus is mounted on a chassis 10 of a traction unit 11 of an articulated vehicle and is located adjacent to the rear of a cabin 12 and at the driver's side of the vehicle. The apparatus includes a base plate 13 which is mounted on the chassis 10 and which extends beyond the side of the chassis 10 to lie in line with the side of the cabin 12. The base plate 13 (FIGS. 3, 4 and 5) is a triangular framework having a transverse arm 14 and a longitudinal side are 15. Adjacent the outer end of the underside of each arm 14, 15 is pivotally attached the piston 16, 17 of a tilting hydraulic ram, the respective cylinders 18, 19 of each ram being pivotally mounted on the chassis 10, the rams 16, 18 and 17, 19 forming two anchor members by which the plate 13 is mounted on the chassis. Adjacent the junction of the arms 14, 15 a third anchor member comprising a ball and socket joint 20 anchors the plate 13 to the chassis 10 and acts as a swivel point for the plate 13. The points of connection of the plate 13 to the chassis 10 are disposed in a right-angled triangular formation, the swivel point being located at the right angle apex. The thickness of the plate 13 increases towards the swivel point for strengthening purposes.

An upright pillar 21 (FIG. 2) is journaled for rotatable movement vertically in an aperture 22 located at the junction of the arms 14, 15. The ram 16, 18 secured between the transverse arm 14 and chassis 10 is normally in an extended position, and the ram 17, 19 secured between the longitudinal arm 15 and chassis 10 is normally in a retracted position. The cylinders 18 and 19 are connected to a hydraulic source (not shown) and the base plate 13 can be inclined through a small transverse arc by actuation of the ram 16, 18 or through a small longitudinal arc by actuation of the ram 17, 19. These inclinations cause the pillar 21 to tilt transversely or longitudinally respectively for purposes to be hereinafter described.

Two arcuate channel rails 28 are mounted on the upper face of the base plate 13, both ends of each rail 28 being provided with stops (not shown).

A slewing ram 24 (FIG. 4) is provided, the outer end of the piston of the slewing ram 24 being pivotally secured to one end of a bar 50 the other end of which bar 50 is keyed to the pillar 21. The outer end of the cylinder of the slewing ram 24 is secured to the base plate 13 adjacent the end of the arm 15.

A fork lift mast assembly includes a mounting beam 25 (FIGS. 2 and 4) having a sleeve 26 secured at one end around the pillar 21. This beam 25 carries, at the other end, a first pair of vertical masts 27 which form the stationary members of the mast assembly.

The first pair of masts 27 carry a second pair of masts 30 which form the movable members of the mast assembly and which are slidable vertically in the masts 27 and a fork carrier 31 is mounted on said second pair of masts 30 for movement in the manner described in my application Ser. No. 577,052. The carrier 31 is so mounted on the mast assembly that it moves at twice the speed of the masts 30.

The beam 25 is rotatable about the axis of the pillar through 90° by retracting or extending the slewing ram 24. When the ram 24 is extended, the mast assembly is located inboard adjacent to the rear of the cabin 12 with the masts 27, 30 in a partially extended condition so that the forks are located on or above the chassis 10. When the ram 24 is retracted the beam 25 is pivoted outboard into alignment with the side of the chassis 10 so that the masts 27, 30 can be fully retracted thereby moving the fork carrier 31 downwards to ground level. Four rollers 29 are mounted under the beam 25 such that two rollers engage each rail 28 thus supporting the beam and giving added stability to the mast assembly. Stops (not shown) limit movement of the assembly between the extreme inboard and outboard positions.

Figure 6:
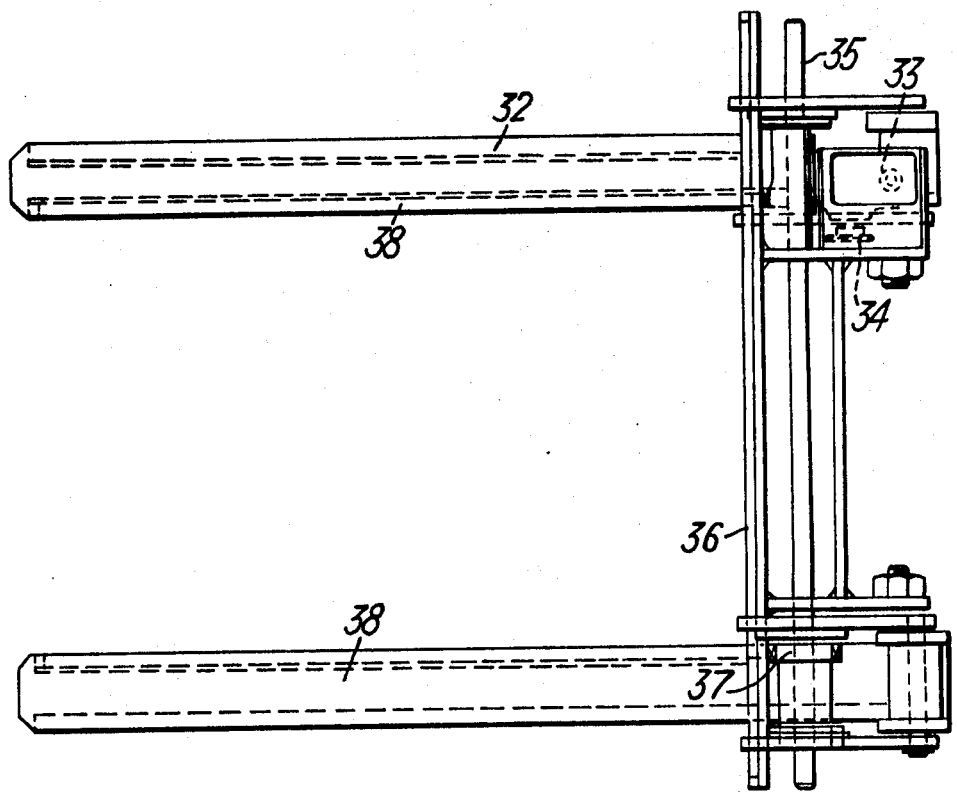
FIG. 6 is a plan view of a fork lift mast assembly with the forks extended from the fork carrier.

A pair of rigid forks 32 (FIGS. 3 and 6) are mounted on the carrier 31 in such a manner that they are retractable. A hydraulic motor 33 is mounted on the carrier 31 and, through a worm reduction gear (not shown), drives an endless chain 34. The chain 34 is connected to a horizontal shaft 35 which is mounted at the lower end of a depending extension 36 of the carrier 31 and has a sprocket wheel keyed thereto. Each outer end of the shaft 35 mounts a cog wheel 37 (FIG. 2) keyed thereto, the cogs of each wheel 37 engaging in the teeth of a rack 38 formed in the inside longitudinal marginal edge of the upper surface of their respective fork 32. Clockwise or anticlockwise rotation of the shaft 35 causes the forks 32 to be retracted or extended respectively. The forks 32 are normally located in an extended position projecting forwardly of the carrier 31. A roller 39 is disposed for free rotatable movement on the carrier extension 36 behind each cog wheel 37 to engage the outside longitudinal marginal edge of the upper surface of the respective fork 32. A pair of transversely disposed rollers 40 are mounted for free rotatable movement on a plate 41 pivotally mounted on the shaft 35 below each cog wheel 37, each roller 40 to engage the outside longitudinal marginal edge of the under surface of the respective fork 32. The rollers 39, 40 together bear the weight of any load on the forks 32 and serve to retain the forks 32 in a horizontal position.

The masts 27, 30 may be operated by a pair of double rams 42 (FIG. 2) laced together, each to extend or retract in opposite directions the distal end of the first piston being pivotally secured to the lower end of the masts 27 and the distal end of second ram being possibly secured to the upper end of the masts 30; the piston of the first ram being extended prior to extension of the piston of the second ram to give, for example, a sixteen feet extended mast assembly from an initial height of 6 feet. A retractable jack 43 is mounted on the chassis 10, on the same side as the assembly, to be extensible downwards to dent the ground prior to the load lifting operation of the assembly. The jack 43 may be provided with a wheel (not shown) mounted on its base to run along the ground when the jack 43 is extended. Alternatively, two or more jacks may be provided in place of jack 43.

A set of five controls 44 are provided to control flow of fluid to or from
1. the slewing ram 24 to pivot the assembly through 90°,
2. the rams 42 to raise or lower the second mast,
3 the cylinder 19 to operate the longitudinal arc tilt of the base plate,
4. the cylinder 18 to operate the transverse arc tilt of the base plate, and
5. the jack 43 to extend or retract it.

A control to switch the motor 33 on or off is also provided.

In the inboard position of the assembly the forks 32 are in the extended position and lie along the chassis 10 facing rearwards, the coupling (not shown) for a trailer to the traction unit 11 being unhindered. In the outboard position, the forks 32, in the extended positions, extend transversely from the chassis 10 and are movable vertically relative to the masts 27, 30.

To pick up a load, a trailer is first uncoupled from the traction unit 11 and the fork lift assembly is swung about the vertical pillar 21 to its outboard position, so that the masts 30 are vertically movable relative to the; masts 27 without hindrance from the chassis 10. The masts 30 are then lowered to their maximum retracted position within masts 27, and the carrier 31 is moved to its maximum lowest position in the masts 30, in which position the under surface of the forks 32 are adjacent to the ground. The forks 32 are then retracted to underlie the chassis 10 as shown in dotted line in FIG. 3. The unit 11 is driven alongside a load to be lifted and due to the positioning of the apparatus in close proximity with the driver, the forks 32 can be accurately positioned for entry into or under a pallet carrying the load. The forks 32 are extended to engage the pallet. The assembly may then be tilted backwards a few degrees to secure the load and to shift the center of gravity of the load closer to the carrier 31. This tilting is effected by retracting the extended ram 16, 18 to pull the base plate downwards transversely of the chassis 10 so that the pillar 21 tilts inwards with consequent inward tilting of the beam 25 and mast assembly 27, 30. The masts 30 are then extended so that carrier 31, extension 37 and forks 32 are raised to a height sufficient to allow the loaded assembly to be swung to the inboard position. The load is now located over the chassis 10. The traction unit 11 is driven alongside the trailer and the mast assembly swung to the outboard position so that the load is suspended over the trailer. The carrier 31, extension 37 and forks 32 are lowered until the forks rest on the trailer and the forks are then retracted leaving the loaded pallet in position on the trailer. The cycle as hereinbefore described is repeated as often as required.

Loaded pallets may be stacked on top of pallets already loaded on to the trailer.

When the trailer deck is inclined longitudinally or if the load to be lifted is lying on a slope, ram 17, 19 is actuated to tilt the mast assembly to the desired angle so that the forks 32 are parallel with the load to be lifted or the deck on to which the load is to be placed.

A hydraulic clamp assembly (not shown) may be provided for attachment to the carrier 31, the clamp being for lifting bricks. The assembly may be collapsible. The assembly includes a web tie adapted at one end for securing to the carrier 31, and has at the other end a depending arm pivotally mounted thereto. The arm projects up beyond the point of connection and is further connected to the piston of a hydraulic ram, the cylinder of which is anchored to the upper face of the tie. A pad is secured to the mast assembly, and a pad is located at the inside face of the marginal bottom edge of the arm. The pads are of rubber and are in alignment so as to clamp the sides of bricks located between them. On actuation of the hydraulic ram, the pad of the arm moves towards and away from the stationary pad to clamp or unclamp a load between the pads.

It is considered that a lifting apparatus as hereinbefore described is advantageous over front and rear-mounted fork lift units because of the very clear view available to the driver with consequent increase in judgement and efficiency. Further, a side mounted forklift requires less maneuvering because it takes less room to draw alongside the load or trailer than to approach from the front or rear.

I claim:
1. A lifting apparatus comprising a base plate of a traction unit of an articulated vehicle for location on a chassis, an upright pillar journaled in the base plate, a fork lift mast assembly mounted on the pillar for pivotal movement about the axis of the pillar between two extreme positions, means to pivotally move the assembly about the pillar, the mast assembly having stationary and movable members, at least one track carried by the base plate and at least one roller mounted on the mast assembly, each roller to engage a track to support and give added stability to the mast assembly during use, a fork carrier mounted on the lower end of the movable members of the mast assembly and having at least two rigid forks which are retractably mounted on the carrier, means being provided to adjust the angular dispositions of the mast assembly relative to the chassis and including anchor members to secure the base plate to the chassis at three angular positions at least two of said members being height adjustable and each constituted by a hydraulic ram, the third member being constituted by a ball and socket joint.

2. Apparatus as claimed in claim 1, wherein a rack is provided on the upper face of each of the forks, a toothed wheel being mounted on the carrier one for each rack, the teeth of each wheel meshing with the teeth of the corresponding rack, and power operated means for rotation of the toothed wheels to extend or retract the forks relative to the carrier.

3. Apparatus as claimed in claim 1, wherein means are provided to extend or retract the movable members of the mast assembly relative to the stationary members and comprises a pair of double acting hydraulic rams laced together, each to extend or retract in opposite directions, the distal end of one piston being pivotally secured to the upper end of the movable members and the distal end of the other piston being pivotally secured to the lower end of the stationary members.

4. A power driven wheeled articulated vehicle with a traction unit having a driver's cabin mounted on the chassis, a base plate mounted on the chassis at the rear of the driver's cabin, an upright pillar journaled in the base plate adjacent the cabin at the driver's side thereof, a fork life mast assembly mounted on the pillar, the mast assembly being pivotally movable between an inboard position in which the mast assembly is adjacent the rear of the cabin, and an outboard position in which the mast assembly extends beyond the side of the chassis, means to pivotally move the assembly about the pillar, the mast assembly having stationary and movable members, at least one track carried by the base plate and at least one roller mounted on the mast assembly, each roller to engage a track to support and give added stability to the mast assembly during use, a fork carrier mounted on the mast assembly and having at least two rigid forks which are retractably mounted on the carrier, means being provided to adjust the angular disposition of the mast assembly relative to the chassis and including anchor members to secure the base plate to the chassis at three angular positions at least two of said members being height adjustable and each constituted by a hydraulic ram, the third member being constituted by a ball and socket joint, the rams being adjustable to alter the angular disposition of the mast assembly to tilt the forks upwardly or downwardly and to plumb the mast assembly to enable the forks to be planer with an undersurface of a load to be lifted and to enable the mast assembly and forks, when loaded, to be then plumbed to enable the forks to be planer with the surface on which the load is to be deposited.

5. A vehicle as claimed in claim 4, wherein a rack is provided on the upper face of each of the forks, a toothed wheel being mounted on the carrier one for each rack, the teeth of each wheel meshing with the teeth of the corresponding rack, and power operated means for rotation of the toothed wheels, when the mast assembly is in an outboard position and is extended with the carrier adjacent the ground, to extend or retract the forks relative to the carrier to be located extending from the side of the chassis or to lie under the chassis respectively.

6. A vehicle as claimed in claim 4, wherein means are provided to extend or retract the movable members of the mast assembly relative to the stationary members and comprises a pair of double acting hydraulic rams laced together, each to extend or retract in opposite directions, the distal end of one piston being pivotally secured to the upper end of the movable members and the distal end of the other piston being pivotally secured to the lower end of the stationary members.